Nov. 8, 1955  E. A. NEUGASS  2,723,342
INSTRUMENT LIGHTING DEVICES
Filed Nov. 26, 1951  2 Sheets-Sheet 1

INVENTOR.
EDWIN A. NEUGASS.
BY
ATTORNEY.

Nov. 8, 1955  E. A. NEUGASS  2,723,342
INSTRUMENT LIGHTING DEVICES
Filed Nov. 26, 1951  2 Sheets-Sheet 2

INVENTOR.
EDWIN A. NEUGASS.
BY
ATTORNEY

United States Patent Office 2,723,342
Patented Nov. 8, 1955

2,723,342

INSTRUMENT LIGHTING DEVICES

Edwin A. Neugass, White Plains, N. Y.

Application November 26, 1951, Serial No. 258,215

4 Claims. (Cl. 240—2.1)

The present invention relates generally to devices for illuminating instrument faces, and is particularly related to devices for externally illuminating the faces of instruments enclosed in sealed cases or housings.

Many sensitive instruments, for example, aircraft instruments, are contained in sealed cases or housings with the indicating faces thereof positioned behind fixed glass. Heretofore, the indicia on the faces and the hands of such instruments have been coated with fluorescent or phosphorescent pigments of a light color which glow when subjected to ultra-violet radiations, and a source of ultra-violet radiations, positioned in cockpit, directed at the faces of the instruments to cause the pigmented indicia and hands to glow. However, when this form of illumination is employed in the cockpit or control station of an airplane or other vehicle, the glow emitted from the fluorescent or phosphorescent pigments, and lingering or continuing after the source of ultra-violet radiations has been removed or deenergized, disturbs the dark adaptation of the pilot's or observer's eyes.

Since it is known that red light does not appreciably impair the dark adaptation of the pilot's eyes, it is the principal object of the present invention to provide devices which employ red light for illuminating the faces of sealed instruments.

Another object is to provide devices for illuminating the faces of sealed instruments of the described character which are effective to direct red light against the faces of the related instruments so that the indicia and hands of the instruments reflect the red light forwardly toward the observer, while preventing the escape of any light toward the observer, with the exception of the above mentioned reflected red light.

A further object is to provide illuminating devices having the aforementioned characteristics which are constructed so that the faces of the related instruments may be viewed along lines of sight which form angles of at least 30° with the perpendiculars to the faces of the instruments.

A still further object is to provide illuminating devices of the described character which are effective to uniformly illuminate the faces of the related instruments.

In accordance with the present invention, the above objects are achieved by providing a panel of transparent plastic material mounted in front of the instrument. With the exception of the portion of the plastic panel overlying the face of the instrument, the front and rear surfaces of the panel, as well as the edges of the latter, are covered first with a layer of light-colored material, preferably white, and then with an outer layer of dark, preferably black, opaque material to prevent escape of light from the portions of the panel covered thereby. Light emitting sources, encased in red-colored filters, are mounted within the transparent plastic panel adjacent the periphery of the latter to emit rays of light converging toward the center of the panel.

In one embodiment of the invention, the rear surface of the panel is coated with a layer of colorless, transparent lacquer having an index of refraction close to the value 1.0 so that there is little reflection of light rays forwardly from the rear surface in the direction toward the observer to interfere with the sharp definition of the indicia and hands of the instrument face by light reflected from the latter.

In accordance with another embodiment of the invention, the central portion of the front surface of the transparent panel is covered first with a light-colored, preferably white, layer and then with a layer of dark, preferably black, opaque material which increases the rearward reflection of light in the direction toward the instrument face at the area of the panel remote from the light emitting sources so that the illumination of the instrument face is substantially uniform over its entire area.

In accordance with still another embodiment of the invention, the transparent panel is formed with a central opening which is tapered rearwardly so that the inclined wall thereof is operative to reflect the converging light rays toward the rear for intensifying the illumination of the instrument face at the areas remote from the light emitting sources.

The above, and other objects, features and advantages of the present invention will be apparent in the following description of preferred embodiments thereof when read in connection with the accompanying drawings forming a part of this specification and wherein.

Figure 1:
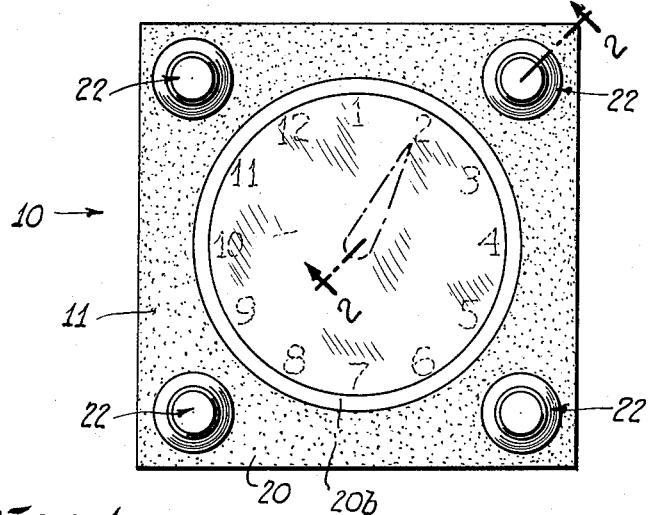
Fig. 1 is a front elevational view of an illuminating device constructed in accordance with an embodiment of the present invention and shown mounted in front of an instrument having a sealed casing.
Figure 2:
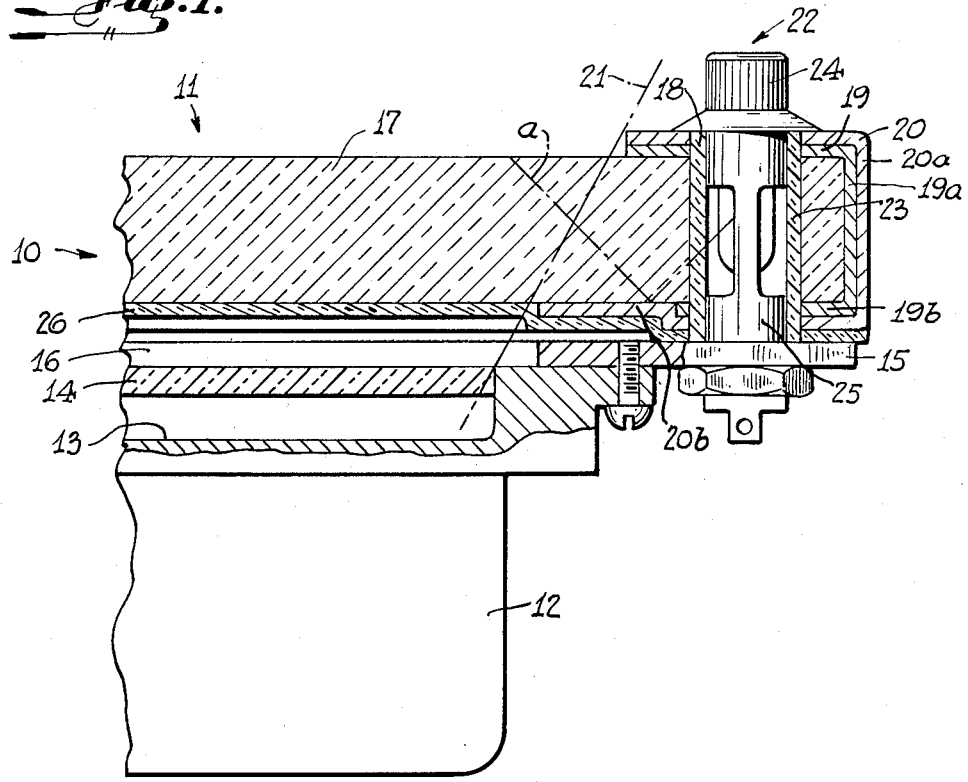
Fig. 2 is a fragmentary sectional view taken along the line 2—2 of Fig. 1 and on an enlarged scale.

Referring to the drawings in detail, and initially to Figs. 1 and 2 thereof, an illuminating device, generally identified by the numeral 10 and constructed in accordance with an embodiment of the present invention, is there shown. The illuminating device 10 includes a panel, generally indicated by the numeral 11, which is mounted in front of an instrument 12 (Fig. 2) having a sealed case and an indicating face 13 which is positioned in back of a fixed glass 14. The instrument 12 is mounted in a conventional manner upon a metal instrument panel 15 with the face of the instrument in registration with a suitable opening formed in the panel 15.

The panel 11 forming a part of the illuminating device 10, includes a core or body 17 of transparent, light transmitting material, preferably plastic, for example, methyl-methacrylate, which is preferably of rectangular or square configuration and has an opening 18 formed therethrough adjacent each of the corners thereof. When the instrument to be illuminated by the device 10 has a circular face, a circular area at the center of each face of the body 17 is polished, while the remainder of the front face of the body 16 is covered with a light colored, preferably white layer 19 and an outer layer of dark colored, preferably black, opaque material, as at 20. The edges of the transparent body 17 are similarly covered by white and black layers 19a and 20a, respectively, which are continuations of the layers 19 and 20 at the front face of the body 17. The white layer 19a at the edges of the body 17 is continued over the rear surface of the latter, as at 19b, while the outer, black and opaque layer 20a is continued over the layer 19b, as at 20b. It will be noted that the outer layer 20b extends further toward the center of the panel 11 than does the layer 19b and the layers 19 and 20, and that the layer 19b terminates closer to the edge of the panel than do the layers 19 and 20. Thus, when the panel is viewed from the front, the layer 20b of dark, and hence non-reflecting material, defines a circular area of substantially the same diameter as the face 13 of the instrument through which the latter may be viewed, while the layers 19 and 20 at the front of the panel define a circular area, of a diameter greater than that of the instrument face, so that the latter is visible even when viewed along sight lines disposed at substantial angles from the axis of the instrument, for example, the line 21 which is inclined at least 30° from the axis of the instrument. Further, since the white layer 19b is cut back relative to the edges of the layers 19 and 20, the first mentioned white layer will normally not be visible from the front.

While the layers 19 and 20, 19a and 20a, and 19b and 20b may be formed of suitable paints which are brushed or sprayed successively on the body 17, in the event that it is desired to provide illuminated indicia (not shown) at the front of the panel 11, the inner white layers are preferably formed of a translucent plastic material and the outer black layers are preferably formed of an opaque plastic material, applied in the manner and of the materials detailed in United States Letters Patent No. 2,518,726, so that, when openings are cut through the front opaque layer to define indicia, the translucent layer will be transilluminated at the portions thereof underlying such openings by light transmitted through the transparent body 17.

Light rays are admitted to the body 17 of the panel 11 by light assemblies, each generally indicated by the numeral 22, which are mounted within the various openings 18 of the body 17. Each assembly 22 includes a cylindrical red colored transparent filter 23 which fits into the related opening 18, and a panel light unit 24 of conventional design, such as, panel lights manufactured under part No. A4295, by the Grimes Manufacturing Co., Urbana, Ohio. Since the panel light unit 24 is a conventional and easily obtainable part, no explanation or description of its details of construction will be entered into in this description. It will be merely noted, that the panel light 24 includes a sleeve 25 within which the light bulb is positioned, and having cutouts in the side walls thereof to permit light rays from the bulb to be emitted radially through the filter 23. As seen in Fig. 2, the light units themselves may be employed for mounting the panel 11 upon the instrument panel 15.

With reference to the above description it will be apparent that the several light units 24, when energized, will emit rays of light which converge toward the center of the body 17, with the transparent material of the latter being effective to transmit the light throughout its length and width. The light rays passing through the body 17 will impinge against the front and rear surfaces of the latter at varying angles, and will be in part reflected from such surfaces for transmission throughout the body. In order to minimize the reflection of light rays from the rear surface of the body 17, and thereby to cut down the intensity of the red light escaping forwardly from the body 17, a layer 26 of colorless, transparent lacquer, having an index of refraction close to the value 1.0 is provided in accordance with the present invention on the rear surface of the body 17. The layer 26 is effective to cut down the unwanted reflection and thereby prevent interference of forwardly reflected light with the sharp definitions of the indicia and hands of the instrument face by light reflected from the latter. The escape of light forwardly towards the observer, other than that reflected from the face of the illuminated instrument, is further resisted by the manner in which the outer black layer 20b overlies, or extends further inward than, the white layer 19b. Thus, as seen in Fig. 2, a ray a emitted from the bulb of the light unit 24 and impinging against the rear surface of the body 17 at an angle which would normally result in its forward reflection at an angle steep enough, with respect to the front surface of the body 17, so that a substantial portion of the intensity of the ray would escape from the body, instead impinges against the overlying portion of the black layer 20b and is absorbed by the latter. Further, since the inner edge of the white layer 19b is cutback with respect to the inner edges of the front layers 19 and 20, the light impinging against this rear white colored layer will not normally be visible from the front of the panel.

Figure 3:
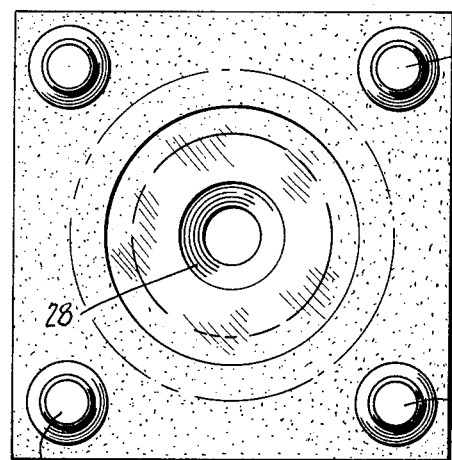
Fig. 3 is a front elevational view of an illuminating device constructed in accordance with another embodiment of the present invention.
Figure 4:
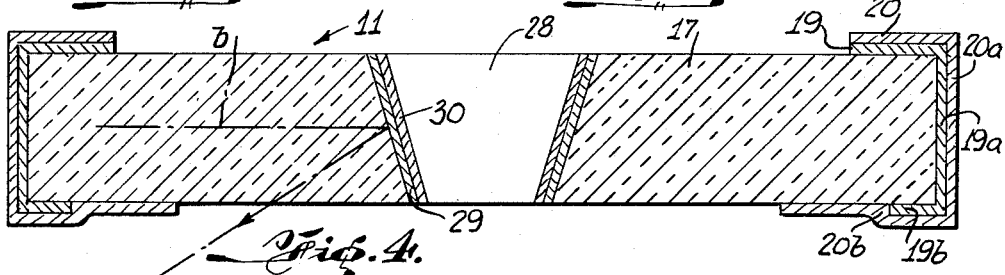
Fig. 4 is a sectional view of Fig. 3 and on an enlarged scale.

Referring now to Figs. 3 and 4, wherein the reference numerals employed in Figs. 1 and 2 are used to identify the same parts, an illuminating device, generally identified by the numeral 27, is there shown to be similar to that previously described with the exception that the body 17 is provided with a centrally located opening 28 extending therethrough and tapering towards the rear surface of the body. In the embodiment of Fig. 4, the surface of the tapering opening 28 is coated with a layer 29 of white material applied directly against the surface of the opening, and a second layer 30 of dark opaque material superimposed on the layer 29. Thus, when a light ray b emitted from any of the light emitting assemblies 22 impinges against the surface of the opening 28, such ray is reflected rearwardly in the direction toward the face of the instrument (not shown) for obtaining uniform illumination of the latter. The effect of the opening 28, formed as above, is to provide uniform intensity of illumination at all areas of the instrument face, including those portions which are relatively remote from the light emitting means.

Figure 5:
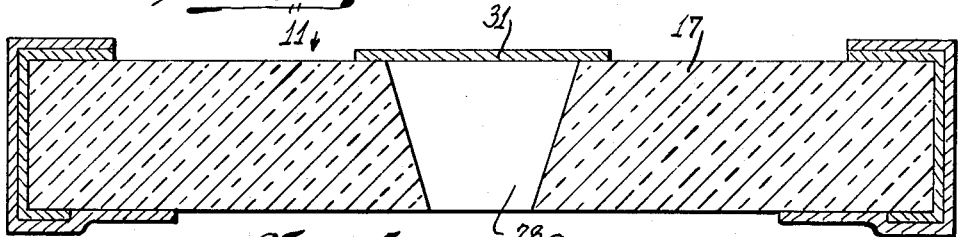
Fig. 5 is a sectional view, similar to Fig. 4, but showing an illuminating device modified according to still another embodiment of the present invention.

Referring to Fig. 5 of the drawing, wherein a further modification is illustrated, it will be seen that the body 17, of the illuminating device panel 11, is formed with an opening 28a located centrally and tapering towards the rear surface, in the manner of the opening 28 of Fig. 4, but that the layers 29 and 30 applied to the surface of the opening 28 are omitted in the embodiment illustrated by Fig. 5. In the embodiment of Fig. 5, the surface of the opening 28a is highly polished in order to obtain the necessary reflection rearwardly of the light rays impinging thereagainst. A plate 31, of suitably opaque material, is positioned across the front end of the opening 28a in order to prevent the forward travel of light rays which may break through the polished surface of the opening 28a. In the embodiment of Fig. 5, as in the embodiment illustrated in Fig. 4, the rearwardly tapering opening 28a is effective to increase the intensity of illumination adjacent the center of the instrument face, and thereby achieve substantially uniform illumination over the entire face of the related instrument.

Figure 6:
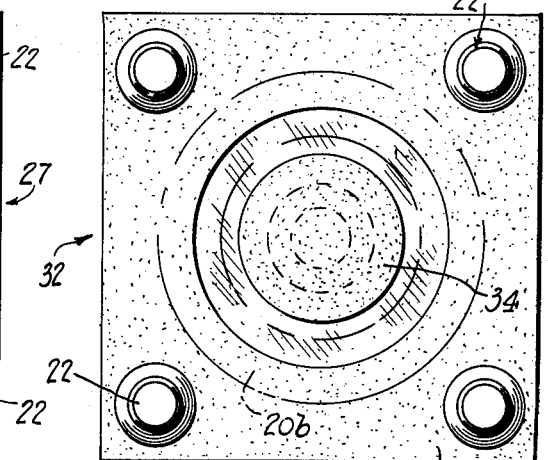
Fig. 6 is a front elevational view of an illuminating device constructed in accordance with a still further embodiment of the present invention.
Figure 7:
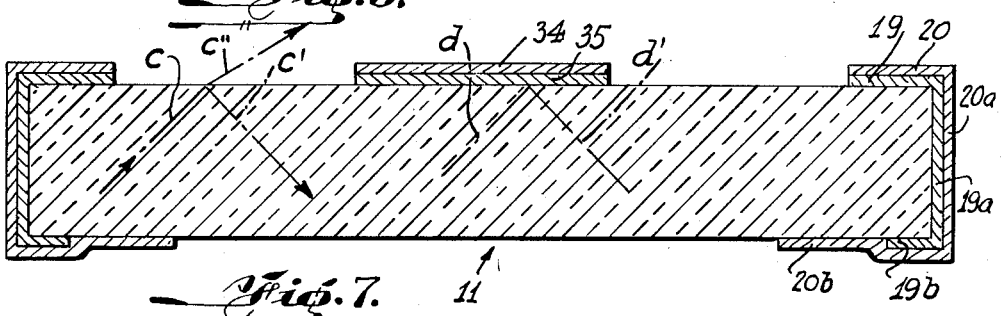
Fig. 7 is a sectional view of Fig. 6.

Referring now to Figs. 6 and 7 of the drawing, wherein reference numerals employed in Figs. 1 and 2 are again utilized for identifying the same parts, an illuminating device, generally indicated by the numeral 32, and constructed according to still another embodiment of the present invention, is there illustrated.

The illuminating device 32 includes a panel 11 formed of the previously described body 17 having the various masking layers 19 and 20, 19a and 20a, and 19b and 20b, applied thereto, and the light emitting units 22 positioned at the four corners of the panel, to direct converging rays of light into the transparent body 17. The embodiment of Figs. 6 and 7 differs from those previously described, in that the central portion of the front face of the body 17 is covered by first a layer 35 of light colored, preferably white, material, and then an outer layer 34, superimposed upon the layer 35, and formed of dark colored, preferably black, opaque material. The layers 35 and 34 are preferably circular, as seen in Fig. 6, when the associated instrument face is also of circular configuration.

The layers 35 and 34 of the panel in Figs. 6 and 7, are effective to promote the uniform illumination of the instrument face positioned therebehind in the following manner:

Light rays, such as the ray c, which impinge against the front surface of the body 17 at points relatively close to the light sources 22 are in part reflected rearwardly, as at c' and in part escape from the front surface of the body 17, as at c". Since the intensity of the rays c, which are relatively close to the light sources, is greater than those at locations within the body 17 remote from the light sources, the escape of the light rays, characterized by the ray c", does not appreciably decrease the intensity of the light directed rearwardly for illuminating the instrument face. However, light rays, such as the ray d, which are passing through portions of the body 17 relatively remote from the light sources 22, and strike against the front surface of the body 17 at the central portion thereof, impinge against the white layer 35, and are entirely reflected rearwardly, as at d', so that these light rays of relatively low intensity, are entirely reflected rearwardly to thereby increase the relative intensity of ilumination at the center of the instrument face. Thus, the illumination over the entire area of the instrument face is made to be substantially uniform.

While the modifications of the present invention illustrated in Figs. 3 and 4, Fig. 5, and Figs. 6 and 7 are not shown to include a layer of colorless transparent lacquer on the rear surface of the light transmitting bodies thereof, such as is illustrated at 26 in Fig. 2, it is to be understood that such layer may be if desired incorporated in any of the modifications mentioned above, and when so incorporated will function as in the embodiment of Fig. 1 and Fig. 2 to reduce the intensity of the light reflected forwardly from the rear surface of the light transmitting body.

From the foregoing description of illustrative examples, it is apparent that the present invention provides devices for illuminating instruments in sealed cases with red colored light and that such devices, necessarily independent of the related instruments, permit viewing of the instrument faces from a wide range of points of view without producing glaring light directed at the observer and without impairing the dark adaptation of the observer's eyes. Further, while only one illuminating device constructed in accordance with each of the several embodiments, is shown associated with a single instrument, it is to be noted that the square configuration of the various panels 11 permits the side-by-side arrangement of a plurality of such panels for the purpose of illuminating a series of instruments, such as are usually mounted on an aircraft instrument panel.

While I have illustrated several preferred embodiments of the invention, it is to be understood that the illustrated and described constructions are presented by way of example only and that many modifications and changes obvious to one skilled in the art may be effected therein without departing from the spirit or scope of the invention as defined in the appended claims.

What I claim is:

1. An instrument illuminating device comprising a sheet of light transmitting material adapted to be mounted in front of an instrument face, masking means on the edges and on portions of the front and rear surfaces of said sheet defining uncovered areas of said surfaces through which the instrument face may be viewed, and light emitting means disposed at several locations adjacent the periphery of said sheet and directing light rays converging toward the center of said sheet for illuminating the instrument face therebehind, said sheet of light transmitting material having a central opening extending completely therethrough and tapering in the direction toward said rear surface of the sheet for rearwardly reflecting the light rays directed toward the center of the sheet, and means associated with said opening and preventing the forward reflection of any light rays passing through the surface defining said opening.

2. An instrument illuminating device as set forth in claim 1; wherein the uncovered area of said front surface of said sheet is larger than the uncovered area of said rear surface of the sheet so that the instrument face may be viewed along sight lines which are inclined at substantial angles relative to the perpendicular to said sheet, and said masking means includes a layer of light colored material superposed directly on said sheet of light transmitting material and an outer layer of opaque dark colored material extending over said light colored layer so that light rays directed toward the outer portions of said sheet and impinging against said light colored layer will be reflected back into the interior of the sheet by said light colored layer, said dark colored layer at the rear surface of said sheet extending further inward toward the center of the latter than the underlying light colored layer so that the portion of the dark colored opaque layer which extends beyond the light colored layer absorbs light impinging thereagainst to prevent the reflection of such light forwardly through said uncovered area at the front surface of said sheet.

3. An instrument illuminating device as set forth in claim 1; wherein the last mentioned means includes an opaque member extending across and sealing the end of said opening at said front surface of the sheet of light transmitting material.

4. An instrument illuminating device as set forth in claim 1; wherein the last mentioned means includes a layer of light colored material covering the interior surface of said opening, and a layer of dark colored opaque material superposed on the last mentioned layer of light colored material.

References Cited in the file of this patent

UNITED STATES PATENTS

| | | |
|---|---|---|
| 2,128,246 | Hardesty | Aug. 30, 1938 |
| 2,150,836 | Lamb | Mar. 14, 1939 |
| 2,220,861 | Blodgett | Nov. 5, 1940 |
| 2,518,726 | Shlenker | Aug. 15, 1950 |
| 2,531,945 | Moulton | Nov. 28, 1950 |
| 2,602,036 | Sullivan | July 11, 1952 |

FOREIGN PATENTS

| | | |
|---|---|---|
| 236,863 | Great Britain | July 16, 1925 |
| 492,258 | Great Britain | Sept. 12, 1938 |
| 884,319 | France | Aug. 10, 1943 |

OTHER REFERENCES

Pearson, "Piping Light With Acrylic Materials," article in "Modern Plastics," August 1946, pages 123–127.